United States Patent [19]

Bennett

[11] E Patent Number: Re. 32,074

[45] Reissued Date of Patent: Jan. 28, 1986

[54] HIGH-SPEED FILLING MACHINE

[75] Inventor: Richard N. Bennett, Arbutus, Md.

[73] Assignee: National Instrument Company, Inc., Baltimore, Md.

[21] Appl. No.: 36,745

[22] Filed: May 7, 1979

Related U.S. Patent Documents

Reissue of:

[64] Patent No.: 4,073,322
Issued: Feb. 14, 1978
Appl. No.: 735,034
Filed: Oct. 22, 1976

[51] Int. Cl.[4] ..... B65B 43/54

[52] U.S. Cl. ..... 141/169; 141/180; 141/181

[58] Field of Search ..... 141/163, 168, 169, 177, 141/180, 181, 183, 186, 188, 191, 248, 270, 283, 284

[56] References Cited

U.S. PATENT DOCUMENTS 3,036,604 5/1962 Donofrio ..... 141/180 X
3,139,713 7/1964 Merrill et al. ..... 53/55
3,322,167 5/1967 Rosen ..... 141/169 X
3,828,833 8/1974 Smith ..... 141/181 X

*Primary Examiner*—Stephen Marcus
*Attorney, Agent, or Firm*—Craig & Burns

[57] ABSTRACT

A high-speed filling machine for filling a fluid product into small containers, in which a continuously moving conveyor belt brings empty containers to their filling position underneath filling nozzles, where the empty containers are held stationary by an indexing mechanism while the filling nozzles are lowered into the empty containers, the fluid product is discharged into the containers and upon completion of discharge stroke of the filling units, the nozzles are again raised whereafter the indexing mechanism will release the filled containers for further movement by the conveyor belt; the single channel from the inlet end thereby branches out into two parallel channels upstream of the filling station, each provided with its own indexing mechanism, while a nozzle support structure which raises and lowers the filling nozzles into the containers, is also adapted to reciprocate so that alternately the empty containers in one channel and then in the other channel are filled.

42 Claims, 4 Drawing Figures

HIGH-SPEED FILLING MACHINE

Matter enclosed in heavy brackets [ ] appears in the original patent but forms no part of this reissue specification; matter printed in italics indicates the additions made by reissue.

The present invention relates to a high-speed filling machine for filling small containers with accurately metered quantities of fluid products at high speeds.

Various filling machines for filling small containers are known in the prior art. For example, the U.S. Pat. No. 3,237,661 discloses a filling machine in which containers moving on a continuously operating conveyor belt in a single line can be filled simultaneously. The drawback of this machine resides in its limitation of the number of containers which can be filled per unit time. Even though limitations exist as the maximum speed at which the filling units can operate, these limitations are of little practical concern at present since the available filling units are capable of operating at considerably higher speeds than the maximum practical speed for such filling machines. The limiting factor in a high-speed filling line is at present the maximum speed at which the conveyor belt of the machine can be operated safely. If the conveyor belt speed is excessive, tipping of the containers will occur and therewith spillage of the fluid product contained therein. For example, if a sixteen nozzle filling machine of the type disclosed in the aforementioned U.S. Pat. No. 3,237,661 is used, in which each nozzle dispenses the liquid product at the rate of fifteen fills per minute, this would provide a theoretical rate of 240 containers per minute. Though the filling units themselves are quite capable of such a rate of operation, the belt speeds required for a single line machine would be prohibitive. With fifteen filling cycles per minute—each cycle consisting of one suction stroke and of one power stroke of the filling unit pump—, each cycle would involve $60/15=4$ seconds. Since the discharge (power stroke of the pump) amounts to 180° of pump shaft rotation per cycle and since about 30° of pump shaft rotation per cycle is used up for each of lowering and raising, the nozzle support structure supporting the sixteen nozzles, only 120° of pump shaft rotation per cycle would be left over within which to remove the sixteen filled containers from under the filling nozzles and bring in sixteen empty containers into position under the sixteen nozzles for the next filling operation. Hence, the time available for moving the sixteen filled containers from under the filling nozzles and bringing in sixteen empty containers under the nozzles would thus be $4\times120/360=1.33$ seconds. Assuming that the bottle diameter of each container is 3 inches, then 48 inches of conveyor belt length would have to be moved in 1.33 seconds. This would amount to a belt speed of about 2,165 inches per minute which is equal to 180 feet per minute belt speed. If a slippage factor of 1.15 is assumed, which is a realistic value, the conveyor belt speed would have to be $180\times1.15=207$ feet per minute. This speed is far too fast for safe operation and would cause the bottles to tip over and spill.

A double line arrangement has already been proposed in the U.S. Pat. No. 3,322,167. Since the arrangement of this U.S. Pat. No. 3,322,167 involves two sets of nozzles cooperating with double-acting pumps, the linear conveyor belt speed could be reduced in the aforementioned example by a factor of one half to about 103.5 feet per minute with the use of eight nozzles in each line, i.e., only eight containers would have to be moved within the available period of time of 1.33 seconds to achieve the filling rate of 240 containers per minute. However, a speed of about 103 feet per minute is still excessive and would still tip over bottles.

The present invention is therefore concerned with the task to eliminate the aforementioned shortcomings and drawbacks and to provide a high-speed filling machine in which a relatively large number of containers can be filled per minute, yet the conveyor belt speed thereof can be kept within reasonable limits to avoid tipping over of bottles and spillage of the fluid product.

The underlying problems are solved according to the present invention in that the filling machine comprises two lines at the filling station and in that the filling nozzles, supported by a nozzle support structure, are reciprocated between the two lines so as to alternately fill the empty containers of one line while permitting the filled containers of the other line to be removed and a new batch of empty containers to be brought into filling position and thereafter to shift the nozzle support structure and fill the empty containers of the other line which had been brought into position underneath the nozzles at the filling station in the meantime, and then to shift again the nozzle support structure back to the one line to thereafter fill the empty containers which had been brought in the meantime into filling position in the one line. With the use of the arrangement according to the present invention, the speed of the conveyor belt can be surprisingly cut by almost one-half as compared to the prior U.S. Pat. No. 3,322,167, i.e., by almost one-fourth compared to the single line filling machine as disclosed in the prior U.S. Pat. No. 3,237,661.

According to the present invention, the nozzle support structure which had been used heretofore only to lower the nozzles supported thereon into the empty containers prior to the discharge (power) stroke and to thereafter raise the nozzles during the suction stroke, before permitting the filled containers to leave the filling station, is additionally operable to reciprocate between two end positions corresponding to the filling positions over the one and over the other line of the two-line filling machine in accordance with the present invention. For purposes of shifting the nozzle support structure, a double-acting pneumatic cylinder and piston unit is used whereby a pneumatic medium under pressure is alternately admitted to the one or the other end of the pneumatic actuating cylinder of the unit, depending on the position of a solenoid valve which alternately connects the source of the pneumatic pressure medium with the one or the other side of the pneumatic cylinder in dependance on the position of the pump shaft while venting the opposite side.

According to another feature of the present invention, the empty containers are automatically guided into the one and the other line by the use of a wedge-shaped gating member without the need for any mechanical movable parts, such as gates or the like, thereby simplifying the arrangement.

Any conventional indexing mechanism may be used in the filling machine of the present invention, for example, as disclosed in the prior U.S. Pat. Nos. 3,067,786 and 3,237,661. However, in a preferred embodiment of the present invention, a container driven star wheel indexing system is used, as disclosed more fully in the copending application Ser. No. 708,635 entitled "Star Wheel Indexing System for Automatic Filling Machines" and filed in the name of Sidney Rosen on July 26, 1976, *now U.S. Pat. No. 4,083,389* the subject matter of which is incorporated herein to the extent necessary. According to this copending a freely rotatable star wheel is provided at its bottom with a downwardly projecting pin member which, upon engagement with a retractable stop member, prevents the free rotation of the star wheel and thereby stops the same as long as the pin member is engaged by the stop member. The stop member itself is adapted to be momentarily retracted, for example, by an electromagnet as a function of the closing of a contact which is closed by a cam mounted on a control shaft, whereupon the star wheel is released to rotate freely, driven by the movement of the containers on the continuously operating, endless conveyor belt, until stopped again by engagement of the pin member with the now projecting stop member. The external configuration of the star wheel is thereby such that it includes a number of sprocket-like projections forming an equal number of pockets therebetween which are preferably so shaped as to conform to a portion of the external contour of the containers to be filled, whereby the star wheel is so placed along the line of the moving bottles that it is engaged by a bottle and is driven thereby as the bottle moves past the same, while being released for rotation by retraction of the stop member. By the same token, if the star wheel is stopped in a predetermined position, stoppage thereof will also prevent the container to be filled which engages with the same to be further moved along by the conveyor belt and instead to be held stationary so that all the containers behind (upstream) of the thus stopped container will also be stopped in the line, with which the stopped star wheel is associated.

Accordingly, it is an object of the present invention to provide a high-speed filling machine which avoids by simple means the aforementioned shortcomings and drawbacks encountered in the prior art.

Another object of the present invention resides in a high-speed filling machine which permits a substantial increase in the number of containers which can be filled per unit time without the danger of a tipping-over of the containers.

Still another object of the present invention resides in a high-speed filling machine in which the danger of tipping over of containers and therewith of spillage of the fluid product filled into a container is eliminated.

A further object of the present invention resides in a high-speed filling machine which operates at relatively high speeds, yet precludes the danger of soiling of the machine by spilled fluid product.

A still further object of the present invention resides in a high-speed filling machine of the type described above which is simple in construction and control yet operates extraordinarily reliable for its intended purpose, These and other objects, features and advantages of the present invention will become more apparent from the following description when taken in connection with the accompanying drawing which shows, for purposes of illustration only, one embodiment in accordance with the present invention and wherein.

Figure 1:
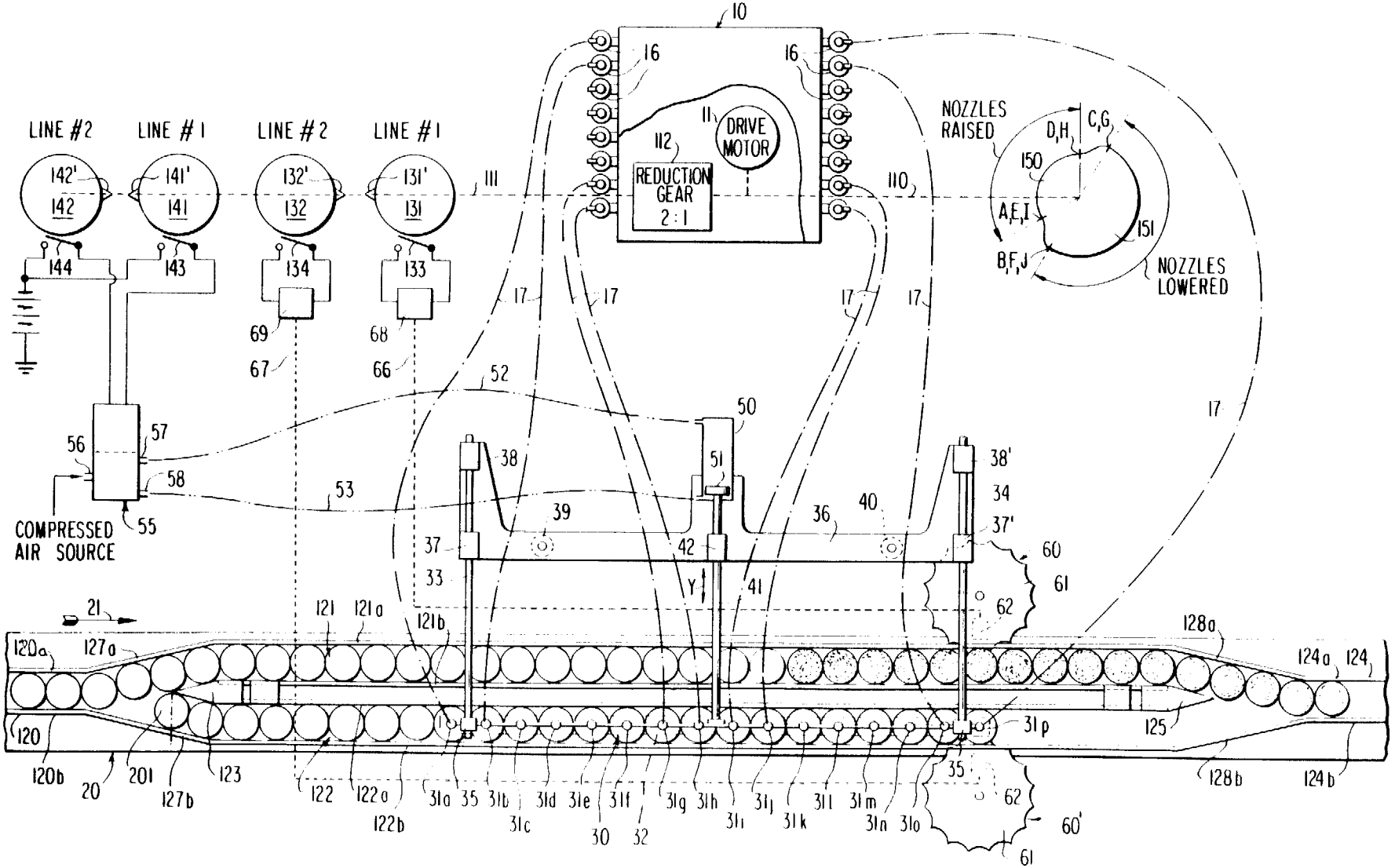
FIG. 1 is a schematic plan view on a filling machine in accordance with the present invention[, and]

Referring now to the drawing, and more particularly to FIG. 1, this figure merely illustrates schematically the filling machine in accordance with the present invention since the filling units, the drive of the filling units, the nozzle support structures supporting the individual filling nozzles, the lowering and raising mechanism for lowering and raising the nozzle support structure and therewith the filling nozzles as well as the indexing mechanism and the conveyor and the controls thereof are known in the art, forming no part of the present invention. For example, the filling units may be as described in the U.S. Pat. No. 2,807,213 while the raising and lowering mechanism of the nozzle support structure may be of the type described in the U.S. Pat. No. 3,237,661 or in the copending application Ser. No. 512,351 filed in the name of Sidney Rosen on Oct. 4, 1974, and entitled "Fluid Filling Machine"[.] , *now U.S. Pat. No. 4,004,620.* The indexing mechanism may be of the type described in U.S. Pat. Nos. 3,067,786 or 3,237,661 or as disclosed in the aforementioned copending applications Ser. No. 708,635.

The filling machine only schematically illustrated in FIG. 1 and generally designated by reference numeral 10 includes the usual drive motor 11 contained within the housing and one filling unit 16 of conventional construction for each filling nozzle. In a sixteen nozzle filling machine, sixteen such filling units are thereby provided which may be arranged, for example, eight filling units on each side of the machine housing. These filling units which include each a pump may be driven in any conventional manner from the motor 11, for example, by the use of separate pump shafts connected to eccentrics or by combining two or more filling units for common actuation, as disclosed, for example, in the copending application Ser. No. 714,903 entitled "Convertible Filling Machine" and filed in the name of Sidney Rosen on Aug. 16, 1976, *now U.S. Pat. No. 4,077,441,* the subject matter of which is incorporated herein by reference. In this last-mentioned application, several filling units are so interconnected that the free ends of the piston rods of the interconnected filling units are driven by a common eccentric drive arrangement from a common pump shaft 110 which may also form the control shaft.

The filling machine further includes an endless conveyor belt generally designated by reference numeral 20 which conveys the empty containers from the inlet end of the machine into the filling position underneath the filling nozzles and the filled containers from the filling position to the downstream outlet end of the filling machine. Additionally, the filling machine also includes a conventional nozzle support structure schematically indicated in FIG. 1 and generally designated by reference numeral 30 which supports thereon a predetermined number of filling nozzles, in the described machine, sixteen filling nozzles 31a through 31p in predetermined position for movement of the filling nozzles in unison in the upward and downward directions (raising and lowering of the nozzles) as well as for movement in unison in a direction transverse to the vertical direction and transverse to the direction of movement of the conveyor belt to enable reciprocation of the nozzles alternately over one or the other line of the machine. For this purpose, the nozzle support structure includes a member 32 extending in the direction of movement of the conveyor belt 20 which is provided with individual holes or preferably with an elongated slot in which the individual filling nozzles are adjustably held in their proper position. The longitudinally extending support member 32 is connected with transversely extending support rods 33 and 34 by means of connecting members 35 while the guide rods 33 and 34 are slidably supported in slide bearing members 37, 38, 37'' and 38' for transverse movement relative to a table-like support structure 36, itself supported on vertical support members slidingly received in vertical tubular slide bearing members 39 and 40 so as to enable reciprocation as well as lowering and raising of the nozzle support structure 32 - 36 and therewith of the filling nozzles. In its center the longitudinal support member 32 is also connected with a further transversely extending rod 41 which is slidingly received on the support structure 36 in a slide bearing member 42 to enable reciprocatory movements thereof in the transverse direction relative to the support structure 36 while partaking in the movements of the latter in the vertical direction. The free end of the rod 41 is connected as piston rod with a piston 51 of a pneumatic actuating cylinder unit generally designated by reference numeral 50 which, depending on the admission of a pressurized pneumatic medium to its one or opposite end, will cause the piston support structure 30 to reciprocate in the direction indicated by the double arrow Y. In actual practice, of course, suitable mechanical structural elements of conventional type which may be adjustable, where required, are used in the machine to assure proper functioning thereof in lieu of the parts indicated only schematically. Since, however, these structural elements are known as such in the art, a detailed description thereof is dispensed with herein for the sake of simplicity.

The conveyor belt 20 of double width conveys empty containers from the inlet end of the machine through a single channel 120 which bifurcates into the two channels generally designated by reference numeral 121 and 122 forming the lines 1 and 2, respectively, at the tip of a fixed wedge-shaped gating member 123. The direction of movement of the conveyor 20 is thereby indicated by arrow 21. The two channels 121 and 122 merge again into a single channel 124 within the area of an oppositely directed wedge shaped gating member 125, which extends toward the outlet end of the machine. The channels 120, 121, 122 and 124 are thereby formed, for example, by appropriate rods 120a and 120b, 121a and 121b as well as 124a and 124b and inclined rod sections 127a, 127b, 128a and 128b which may all be adjustable by conventional means so as to adjust the various channels in width to fit the particular contour and dimensions of the containers to be filled.

The pneumatically operated cylinder piston unit 50 is controlled by a solenoid valve generally designated by reference numeral 55 whose input 56 is adapted to be connected with a compressed air source and whose two outputs 57 and 58 are adapted to be connected with opposite ends of the cylinder unit 50 by way of lines 52 and 53.

The indexing mechanism of the machine of FIG. 1 preferably is of the type which, as disclosed in the copending application Ser. No. 708,635, *now U.S. Pat. No. 4,083,389*, includes two adjustably positioned star wheel indexing mechanisms generally designated by reference numeral 60 and 60' of similar construction so that only one thereof will be described in somewhat greater detail. Each indexing mechanism 60 and 60' includes a star wheel 61 provided with a number of sprockets corresponding to the number of containers to be filled simultaneously, i.e., in the given embodiment with sixteen sprockets thereby forming sixteen pockets, whereby the external configuration of each pocket is so designed as to match the external configuration of the container to be filled. Each star wheel 61 is freely rotatably supported and so positioned in relation to the containers in the channels 121 and 122 that it is rotated (container-driven) by the passing containers as long as the star wheel 61 is not stopped. For indexing purposes each star wheel 61 is provided with a pin member (not shown) projecting downwardly from its bottom surface which is adapted to engage with a stop member (not shown) normally projecting into its path as the star wheel 61 rotates to a predetermined position. The stop member is adapted to be momentarily retracted by an electromagnet 62 to cause disengagement from the pin member and to thereby permit one complete, container-driven rotation of the star wheel so that 16 containers are thereby permitted to move past the star wheel before the star wheel 61 will again come to a stop upon engagement of its pin member with the stop member. Two rotatable cam disks 131 and 132 each provided with cam projections 131' and 132', properly positioned thereon as will be described more fully hereinafter, will close at the proper moment a respective contact 133 and 134 which in turn will cause momentary energization of the electromagnet 62 by way of the line 66 and 67 connected with a suitable control unit 68 and 69. In practice, the closing of a contact 133 or 134 will apply an electrical potential to the winding of the electromagnet 62 to thereby energize the same so as to momentarily retract the stop member and thereby release the container-driven star wheel 61 for one rotation.

The solenoid valve 55, in its turn, is controlled by cam projections 141' and 142' on rotatable cam disk 141 and 142 whereby the cam disks 131, 132 and 141, 142 may all be mounted for rotation in unison on a control shaft 111 driven from the drive motor 11 by way of a reduction gear 112, providing a speed reduction of 2:1 with respect to the pump or control shaft 110, which itself may be driven by the motor 11 by way of a suitable speed reduction.

Additionally, the drive motor 11 is operatively connected by way of the pump shaft 110, either directly or indirectly, with a cam disk 150 which has a raised cam portion 151 to lower the nozzle support structure 30 and therewith the filling nozzles in the containers prior to the discharge stroke of the filling units 16. Conventional cam follower means and mechanical linkages are thereby provided to raise and lower the support structure 36, and therewith the parts fixedly or slidingly supported thereon by the use of vertical support rods or columns sliding within tubular vertical slide bearing members 37, 38, 39, 40 and 41. The cylinder unit 50 itself is thereby movable in unison with the vertical movements of the support structure 36.

The sixteen filling units 16 are connected by way of suitable hoses 17 with the respective filling nozzle 31a through 31p.

OPERATION

In operation, the conveyor belt 20 rotates continuously at a predetermined speed which is preferably adjustable. The drive motor 11 drives the filling unit 16 by way of pump shaft(s) 110 to provide, for example, fifteen complete filling cycles per minute, i.e., at a speed of fifteen rotations per minute for the pump shaft(s) 110. Any appropriate gearing arrangement between motor 11 and shaft 110 may be used to achieve the desired speed. Furthermore, the speed of the drive motor may also be adjustable by conventional means.

Figure 2:
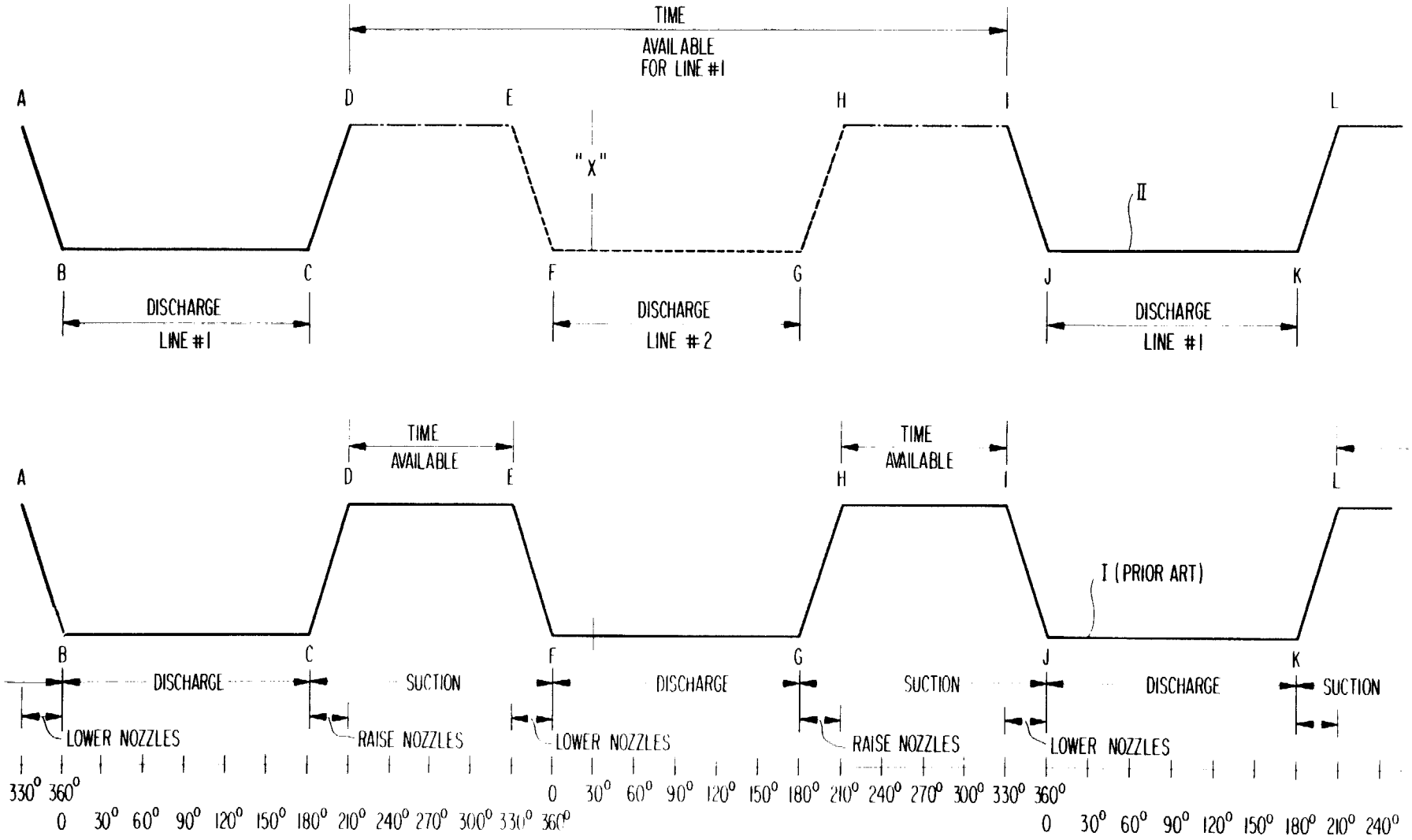
FIG. 2 is a diagram illustrating the operation of the filling machine in accordance with the present invention as compared to the operation of a single line filling machine of the prior art[.]

During each rotation of the pump shaft(s) 110 of the filling unit 16, each filling unit undergoes a suction stroke during 180° of its pump shaft rotation and a discharge or power stroke during the other 180° of its pump shaft rotation. Referring now to FIG. 2, which shows the vertical movement and position of the filling nozzles as a function of degrees pump shaft rotation for a prior art single-line machine (curve I) and for a double-line machine of the present invention (curve II), at point A of the upper curve (II) of this figure, the nozzle support structure and piston 51 are in the opposite end position from that shown in FIG. 1, i.e., in a position in which the nozzles 31a through 31p are aligned with the empty containers of channel 121 (line 1), which are held in position by the stopped star wheel 61 associated with line 121. During about 30° of rotation of the pump shaft 110, representing the last 30° of the suction stroke, from point A to point B of the cam 151 corresponding to points A and B of FIG. 2, the nozzle support structure 30 is lowered to thereby lower the nozzles 31a–31p into the containers of line 121. From point B to point C (180° of pump shaft rotation), the filling units 16 undergo their power strokes, thereby discharging the fluid product into the containers in accurately metered amounts. At point C, representing the beginning of the suction stroke, cam 151 will cause the nozzles to be raised again so that the nozzles are completely out of the filled containers at point D of FIG. 2 about 30° of pump shaft rotation later. At this point, the projecting cam member 131′ of cam 131 closes the contact 133 thereby momentarily energizing the electromagnet 62 to retract the stop member out of engagement with the pin member of the indexing mechanism 60 and thereby permitting the star wheel 61 to freely rotate, container-driven, for one complete rotation, whereby sixteen containers are indexed which, permits the sixteen filled containers shown in cross-hatching to leave their filling position, in which they were held previously by the stopped star wheel 61 and to bring in sixteen empty containers under the filling nozzles. At point D the projecting cam member 141′ of cam 141 closes the contact 143, thereby energizing the solenoid valve 55 so as to supply compressed air from output 57 by way of line 52 to the far end of the cylinder unit 50, as a result of which the nozzle support structure 30 is displaced from its position over channel 121 into its filling position over channel 122 as shown in FIG. 1.

At point E, cam 151 again causes the nozzle support structure 30 to be lowered, thereby now lowering the filling nozzles 31a through 31p into the empty containers in channel 122 held in their filling position by the stationary star wheel 61 of indexing mechanism 60′, itself held fast by abutment of its pin member at the corresponding projecting stop member. The lowering of the nozzle support structure is completed at point F where the discharge stroke of the filling units 16 commences, which lasts until point G. At point G cam 151 causes the nozzle support structure 30 to be raised thereby raising the filling nozzles 31a through 31o out of the filled containers in channel 122 (line 2). Furthermore, at point H, the projecting cam member 132′ of cam 132 closes contact 134 to thereby momentarily retract the stop member from the pin member of the star wheel 61 associated with channel 122 so as to permit the release of the filled containers by indexing sixteen containers corresponding to one complete revolution of the star wheel 61. Also at point H the projecting cam member 142′ of cam 142 closes contact 144 which causes the solenoid valve 55 to connect the compressed air source input 56 with the output 58, thereby displacing the piston 51 in the pneumatic cylinder unit 50 into the position opposite from that shown in FIG. 1. At point I, the cam member 151 again causes the nozzle support structure 30 to be lowered thereby lowering the filling nozzles 30a through 30o into the empty containers, now held in position underneath the filling nozzles in channel 121. The discharge of the filling units 16 commences again at point J. As is quite clear, at point I the cycle of operation described beginning with point A will be repeated.

While the nozzles together with the nozzle support structure are lowered and raised once during each cycle of the filling units 16, i.e., once during each rotation of the pump shaft 110, the selective energization of the star wheel indexing mechanism 60 and 60′, i.e., the release of the respective star wheel thereof, takes place only during every alternate rotation of the pump shaft(s) 110. The same is also true for the selective energization of the solenoid valve 55. Hence, the cams 131, 132, 141, 142 are rotated by way of control shaft 111 at a speed which is one-half the speed of the pump shaft or shafts 110, actuating the pistons of the filling units 16 and rotating can 151.

A comparison of the lower curve I of FIG. 2, representing the discharge cycle for a sixteen unit filling machine carrying out fifteen cycles per minute according to my prior U.S. Pat. No. 3,237,661 with the curve II, in which the full line portion represents the discharge of line 1 and the dotted curve the discharge of line 2, shows that the time available for moving the sixteen containers in the lower curve I is about 120° rotation of pump shaft, i.e., 1.33 seconds, assuming fifteen cycles per minute. In contradistinction thereto, in the machine according to the present invention, the time available for moving the sixteen containers in each line is about 480° (time interval from point D to I), which is an improvement about 4:1.

Utilizing the values in the above calculations, it is noted that the 48 inches, corresponding to sixteen containers with a diameter of 3 inches each, which must be displaced per working cycle, now can take place over a period of time or more than 4 seconds. However, even assuming that only 4 seconds were available, this would mean 60 feet per minute which with a slippage factor 1.15, would give a speed of about 69 feet per minute, a value well within permissive limits.

In the filling machine according to the present invention, no mechanically movable gating devices are required since an automatic gating is achieved by the wedge-shaped members 123 and 125 cooperating with the inclined rods 127a, 127b and 128a, 128b. It is only necessary that the tip of the wedge-shaped member 123 be so positioned in relation to the indexing wheel 61 that the farthest upstream container in a given channel whose star wheel is held stationary, has its diametric plane coinciding with the tip of the wedging member. This is shown with respect to the empty container 201 whose center line coincides with the tip of the wedging member 123 while channel 122 is filled by the stoppage of the star wheel 61. With this arrangement the containers which will continue to move in channel 120 as long as one of the channels 121 or 122 is not completely filled will automatically roll off along the farthest upstream stationary container of a filled channel, i.e., container 201 in FIG. 1, to pass into the channel 121. This feature eliminates the need for complicated mechanical movable gating mechanisms thereby further simplifying the filling machine in accordance with the present invention.

Figure 3:
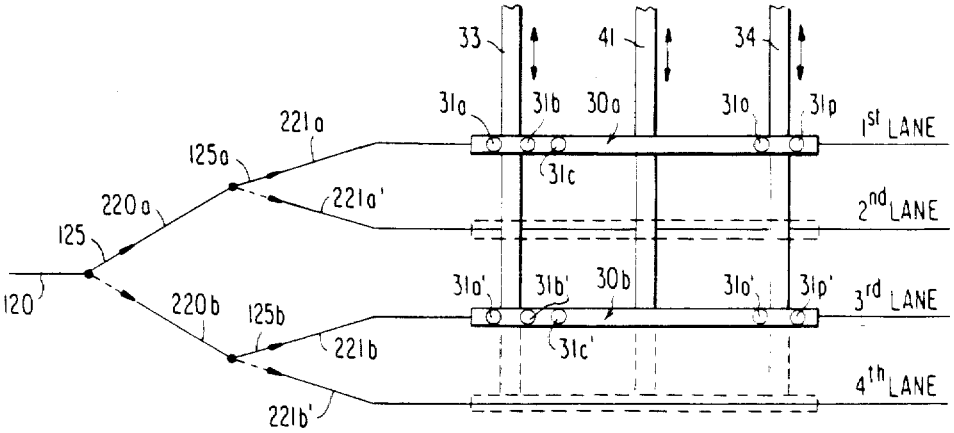
*FIG. 3 is a schematic view of a modified embodiment of a filling machine in accordance with the present invention with a single feed channel branching out into four channels and with two rows of filling nozzles on the nozzle support; and*
Figure 4:
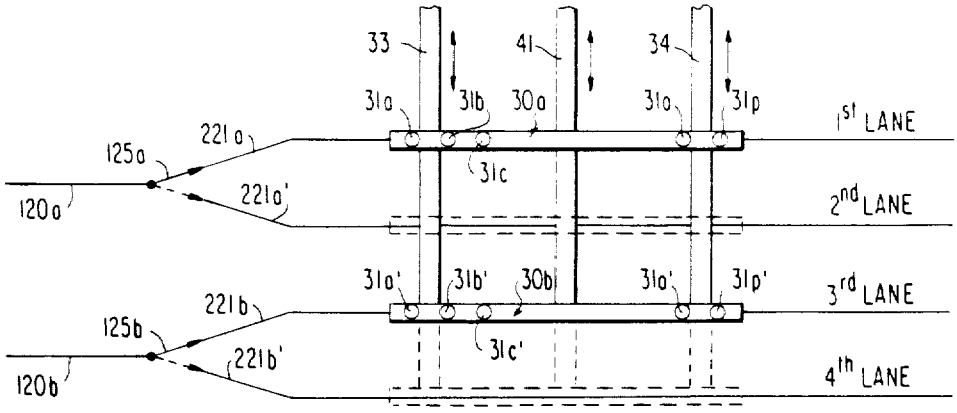
*FIG. 4 is a schematic view illustrating a filling machine of the type shown in FIG. 3 with two separate feed channels and a single feed-out channel in accordance with the present invention.*

Instead of two lanes, the machine may also include more lanes, for example, four lanes fed from a single lane which bifurcates into two lanes which themselves then bifurcate into two lanes each to form the four lanes. *FIG. 3 illustrates schematically a machine with a single feed lane 120 which bifurcates into two lanes 220a and 220b which themselves then each bifurcate into two lanes 221a, 221a' and 221b, 221b'. The gating members 125, 125a and 125b may be of any conventional construction.* The machine is then provided with a nozzle support structure *30a, 30b, 33, 34, 41, etc.* forming two parallel rows of filling nozzles *31a, 31b, . . . 31o, 31p and 31a', 31b', . . . 31o', 31p'* which are then reciprocated between 1st and 3rd lane and 2nd and 4th lane, respectively. The conveyor speed can again be cut down by approximately one-half as compared to the machine described and illustrated herein. Furthermore, two feed lanes may also be provided in lieu of the single lane, which then bifurcate into the four lanes [.] , *as schematically illustrated in FIG. 4.*

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A filling machine for filling containers with a fluid product by the use of several filling nozzles, which comprises a number of filling units performing working cycles, which are operatively connected with a corresponding number of filling nozzles and are operable for filling containers with the fluid product by way of the nozzles during the working cycles thereof, nozzle support means supporting thereon the filling nozzles in proper position, means for lowering and raising the nozzle support means and therewith the filling nozzles into and out of containers held under the filling nozzles, indexing means for holding containers stationary in their filling positions during the filling operation on a continuously running conveyor means, and control means for controlling the operation of the filling machine including means correlating the operation of the indexing means and the lowering and raising of the nozzle support means with the working cycle of the filling units, characterized in that two substantially parallel channel means defined in part by said conveyor means are provided which branch out from a single channel means upstream of the filling station and which recombine again into a single channel means downstream of the filling station, in that said indexing means are coordinated to each channel means to hold a predetermined number of containers corresponding to the number of the filling nozzles stationary in the respective channel means during the filling operation, and in that reciprocating means which are operatively connected with said control means are provided for the nozzle support means to alternately place the filling nozzles over containers to be filled in one channel means during a respective working cycle and after completion of the filling operation thereof, to move the nozzle support means transversely to the direction of movement of the conveyor means over the other of the two parallel channel means to fill the containers which have been brought into filling position in the meantime in said other channel means during the next working cycle and which are held stationary thereat during the filling operation of such working cycle by the respective indexing means.

2. A filling machine according to claim 1, characterized in that said control means is operable to lower and raise the nozzle support means once during each working cycle of the filling units while the indexing means of a given channel means is actuated to release the filled containers of the corresponding channel means only every alternate cycle of the filling units, upon completion of the filling operation of the corresponding channel means and after the filling nozzles have been raised out of the filled containers in the corresponding channel means.

3. A filling machine according to claim 2, characterized in that the reciprocating means is controlled by said control means in such a manner that the nozzle support means is displaced in one direction by said reciprocating means upon completion of the filling operation and upon raising of the filling nozzles out of the containers in one channel means, from its position over the one channel means to its position over the other channel means and is thereafter displaced again in the opposite direction upon completion of the filling operation of the containers in the other channel means and upon raising of the filling nozzles out of the containers in the other channel means, from its position over said other channel means to its position over said one channel means.

4. A filling machine according to claim 3, characterized in that the reciprocating means includes a pneumatically controlled piston-cylinder unit, with a piston rod connected with the nozzle support means, and solenoid valve means selectively controlled by said control means for selectively supplying a pneumatic medium under pressure to one or the other end of the cylinder unit.

5. A filling machine according to claim 4, characterized by fixed gating means for automatically gating the containers from the single channel means into that one of the two parallel channel means which is not yet filled with containers.

6. A filling machine according to claim 5, characterized in that the fixed gating means includes a wedge-shaped member pointing with its tip toward the inlet side of the machine and located between the two parallel channel means near the upstream end thereof in such a manner that its inclined wedging surfaces form the inner boundary of the bifurcation into the two channel means.

7. A filling machine according to claim 6, characterized in that the tip of the wedge-shaped member, which points in a direction opposite the direction of movement of the conveyor means is so located in relation to the indexing means of a respective channel means that the center plane of the farthest upstream container of a filled channel means coincides substantially with the tip of the wedge-shaped member when the corresponding channel means is filled with containers held fast by the respective indexing means.

8. A filling machine according to claim 7, characterized in that a wedge-shaped member pointing in the direction of movement of the conveyor belt is also provided at the downstream end where the two channel means recombine into a single channel means.

9. A filling machine according to claim 7, characterized in that the indexing means includes for each channel means a container-driven star wheel having a predetermined number of projections which are so positioned as to be engaged by the moving containers, a pin member projecting from the underside of the star wheel and a retractable stop means operable to engage with the pin member to hold the star wheel stationary, said stop means being operable to be momentarily retracted out of engagement with the pin member by said control means upon completion of the filling operation of a respective channel means and upon raising of the filling nozzles out of the filled containers of the corresponding channel means.

10. A filling machine according to claim 9, characterized in that each star wheel is shaped along its outer configuration in such a manner that it corresponds at least approximately to a portion of the outer configuration of the container.

11. A filling machine according to claim 10, characterized in that each star wheel is so positioned in relation to its associated channel means that its sprocket like projections engage into the path of the containers moving on the conveyor means so that upon retraction of the stop means, it is rotated container-driven until the pin member again comes into abutment at the retractable stop means.

12. A filling machine according to claim 11, characterized in that the conveyor means is a conveyor belt having a width at least corresponding to the width of the two channels at the filling station.

13. A filling machine according to claim 1, characterized in that the reciprocating means is controlled by said control means in such a manner that the nozzle support means is displaced in one direction by said reciprocating means upon completion of the filling operation and upon raising of the filling nozzles out of the containers in one channel means, from its position over the one channel means to its position over the other channel means and is thereafter displaced again in the opposite direction upon completion of the filling operation of the containers in the other channel means and upon raising of the filling nozzles out of the containers in the other channel means, from its position over said other channel means to its position over said one channel means.

14. A filling machine according to claim 13, characterized in that the reciprocating means includes a pneumatically controlled piston-cylinder unit, with a piston rod connected with the nozzle support means, and solenoid valve means selectively controlled by said control means for selectively supplying a pneumatic medium under pressure to one or the other end of the cylinder unit.

15. A filling machine according to claim 1, characterized by fixed gating means for automatically gating the containers from the single channel means into that one of the two parallel channel means which is not yet filled with containers.

16. A filling machine according to claim 15, characterized in that the fixed gating means includes a wedge-shaped member pointing with its tip toward the inlet side of the machine and located between the two parallel channel means near the upstream end thereof in such a manner that its inclined wedging surfaces form the inner boundary of the bifurcation into the two channel means.

17. A filling machine according to claim 16, characterized in that the tip of the wedge-shaped member, which points in a direction opposite the direction of movement of the conveyor means is so located in relation to the indexing means of a respective channel means that the center plane of the farthest upstream container of a filled channel means coincides substantially with the tip of the wedge-shaped member when the corresponding channel means is filled with containers held fast by the respective indexing means.

18. A filling machine according to claim 16, characterized in that a wedge-shaped member pointing in the direction of movement of the conveyor is also provided at the downstream end where the two channels recombine into a single channel.

19. A filling machine according to claim 1, characterized in that the indexing means includes for each channel a container-driven star wheel having a predetermined number of projections which are so positioned as to be engaged by the moving containers, a pin member projecting from the underside of the star wheel and a retractable stop means operable to engage with the pin member to hold the star wheel stationary, said stop means being operable to be momentarily retracted out of engagement with the pin member by said control means upon completion of the filling operation of a respective channel means and upon raising of the filling nozzles out of the filled containers of the corresponding channel means.

20. A filling machine according to claim 19, characterized in that each star wheel is shaped along its outer configuration in such a manner that it corresponds at least approximately to a portion of the outer configuration of the container.

21. A filling machine according to claim 19, characterized in that each star wheel is so positioned in relation to its associated channel means that its sprocket like projections engage into the path of the containers moving on the conveyor belt means so that upon retraction of the stop means, it is rotated container-driven until the pin member again comes into abutment at the retractable stop means.

22. A filling machine according to claim 1, characterized in that the conveyor means is a conveyor belt having a width at least corresponding to the width of the two channel means at the filling station.

23. A filling machine with a filling station for filling containers with a fluid product by the use of several filling nozzles, which comprises two substantially parallel channel means within the area of the filling station, which are defined at least in part by a *conveyor belt* continuously running [,] in operation, [conveyor belt,] a number of filling units operatively connected with a corresponding number of filling nozzles, nozzle support means supporting thereon the filling nozzles in proper position, means for lowering and raising the nozzle support means and therewith the filling nozzles into and out of containers held under the filling nozzles, indexing means for said channel means for holding containers stationary in their filling positions during the filling operation on the conveyor belt and control means for the filling machine to control its operation including means for correlating the operation of the indexing means and the lowering and raising of the nozzle support means with the operation of the filling units, characterized in that reciprocating means which are operatively connected with the control means are provided for the nozzle support means to alternately place the filling nozzles over the containers to be filled in one channel means and after completion of the filling operation thereof, to move the nozzle support means transversely to the direction of movement of the conveyor belt over the other of the two channel means to fill the containers which have been brought into filling position in the meantime in said other channel *means* and which are held stationary thereat during the filling operation by the respective indexing means.

*24. A filling machine with a filling station for filling containers with a fluid product by the use of several filling nozzles, which comprises two substantially parallel channel means within the area of the filling station which are defined at least in part by conveyor means, a number of filling units operatively connected with a corresponding number of filling nozzles, nozzle support means supporting thereon the filling nozzles in proper position, means for lowering and raising the nozzle support means and therewith the filling nozzles into and out of containers held under the filling nozzles, indexing means for said channel means for determining the number of containers to be filled in a given filling operation while held stationary in the filling positions on the conveyor means during the filling operation, and control means for the filling machine to control its operation including means for correlating the operation of the indexing means and the lowering and raising of the nozzle support means with the operation of the filling units, characterized in that reciprocating means which are operatively connected with the control means are provided for the nozzle support means to alternately place the filling nozzles over the containers to be filled in one channel means and after completion of the filling operation thereof, to move the nozzle support means transversely to the direction of movement of the conveyor means over the other channel means to fill the containers which have been brought into filling position in the meantime in said other channel means and which are held stationary thereat during the filling operation.*

*25. A filling machine according to claim 24, characterized in that said conveyor means includes at least one endless conveyor belt.*

*26. A filling machine according to claim 25, characterized in that at least said one endless conveyor belt is running continuously in operation.*

*27. A filling machine according to claim 23, 24, 25 or 26, characterized in that two feed lanes are provided feeding the channel means.*

*28. A filling machine according to claim 27, characterized in that four channel means are provided within the area of the filling station.*

*29. A filling machine according to claim 28, characterized in that the nozzle support means supports thereon two parallel rows of filling nozzles.*

*30. A filling machine according to claim 23 or 24, characterized in that the two channel means merge into a single channel downstream of the filling station.*

*31. A filling machine according to claim 30, characterized in that one feed channel is provided for the two channel means which branches out into the two channel means upstream of the filling station.*

*32. A filling machine according to claim 30, characterized in that the two feed lanes are provided for feeding the channel means.*

*33. A filling machine according to claim 32, characterized in that four channel means are provided within the area of the filling station.*

*34. A filling machine according to claim 33, characterized in that the nozzle support means supports thereon two parallel rows of filling nozzles.*

*35. A filling machine according to claim 23, characterized in that the two channel means merge into a single feed-out channel.*

*36. A filling machine according to claim 35, characterized in that a single conveyor belt is provided for the two channel means and the single feed-out channel.*

*37. A filling machine according to claim 23, characterized in that a single conveyor belt is provided for the two channel means.*

*38. A filling machine with a filling station for filling containers with a fluid product by the use of several filling nozzles, which comprises two substantially parallel channel means within the area of the filling station which are defined at least in part by conveyor means, filling means operatively connected with the filling nozzles, nozzle support means supporting thereon the filling nozzles in proper position, means for lowering and raising the nozzle support means and therewith the filling nozzles into and out of containers held under the filling nozzles, indexing means for said channel means for determining the number of containers to be filled in a given filling operation, while held stationary in the filling positions on the conveyor means during the filling operation, and means for operating the filling machine through at least one control cycle including control means for the indexing means, the means for lowering and raising the nozzle support means and the filling means, characterized in that reciprocating means are provided for the nozzle support means to alternately place the filling nozzles over the containers to be filled in one channel means and after completion of the filling operation thereof, to move the nozzle support means transversely to the direction of movement of the conveyor means over the other channel means to fill the containers which have been brought into the filling position in the meantime in said other channel means and which are held stationary thereat during the filling operation, said reciprocating means being controlled in proper timed relationship to the operation of the filling machine by control means therefor.*

*39. A filling machine according to claim 38, characterized in that the two channel means merge into a single feed-out channel.*

*40. A filling machine according to claim 39, characterized in that a single conveyor means is provided for the two channel means and the single feed-out channel.*

*41. A filling machine according to claim 38, characterized in that a single conveyor means is provided for the two channel means.*

*42. A filling machine with a filling station for filling containers with a fluid product by the use of several filling nozzles, which comprises two substantially parallel channel means within the area of the filling station which are defined at least in part by conveyor means, filling means*

*operatively connected with the filling nozzles, nozzle support means supporting thereon the filling nozzles in proper position, means for lowering and raising the nozzle support means and therewith the filling nozzles into and out of containers held under the filling nozzles, indexing means for said channel means for determining the number of containers to be filled in a given filling operation, while held stationary in the filling positions on the conveyor means during the filling operation, and means for operating the filling machine through at least one control cycle including control means for the indexing means, the means for lowering and raising the nozzle support means and the filling means, characterized in that reciprocating means are provided for the nozzle support means to alternately place the same filling nozzles over the containers to be filled in one channel means and after completion of the filling operation thereof, to move the nozzle support means and therewith said filling nozzles transversely to the direction of movement of the conveyor means over the other channel means to fill the containers which have been brought into the filling position in the meantime in said other channel means by said filling nozzles and which are held stationary thereat during the filling operation, said reciprocating means being controlled in proper timed relationship to the operation of the filling machine by control means therefor.*

* * * * *